United States Patent [19]
Thomas, III

[11] Patent Number: 6,097,562
[45] Date of Patent: Aug. 1, 2000

[54] DISK DRIVE FOR DETECTING A RETROREFLECTIVE MARKER ON A DATA STORAGE CARTRIDGE

[75] Inventor: Fred C. Thomas, III, Ogden, Utah

[73] Assignee: Iomega Corporation, Roy, Utah

[21] Appl. No.: 08/931,272

[22] Filed: Sep. 15, 1997

Related U.S. Application Data

[63] Continuation-in-part of application No. 08/833,032, Apr. 3, 1997, Pat. No. 5,986,838, which is a continuation of application No. 08/388,242, Feb. 14, 1995, Pat. No. 5,638,228.

[51] Int. Cl.$^7$ ................................................ G11B 15/04
[52] U.S. Cl. ............................................................. 360/60
[58] Field of Search .................................. 360/60, 99.01, 360/99.02

[56] References Cited

U.S. PATENT DOCUMENTS

| | | | |
|---|---|---|---|
| 3,718,078 | 2/1973 | Plummer | 95/49 |
| 3,727,045 | 4/1973 | Warren et al. | 246/169 A |
| 3,995,376 | 12/1976 | Kimble et al. | 35/25 |
| 4,080,899 | 3/1978 | Luban | 102/42 R |
| 4,102,059 | 7/1978 | Kimble et al. | 35/25 |
| 4,244,683 | 1/1981 | Rowland | 425/143 |
| 4,332,847 | 6/1982 | Rowland | 428/156 |
| 4,498,882 | 2/1985 | Evert | 441/116 |
| 4,578,042 | 3/1986 | Evert | 441/117 |
| 4,592,554 | 6/1986 | Gilbertson et al. | 273/312 |
| 4,607,978 | 8/1986 | Eigenmann | 404/73 |
| 4,633,451 | 12/1986 | Ahn et al. | 369/14 |
| 4,649,264 | 3/1987 | Carson | 235/54 |
| 4,652,172 | 3/1987 | Eigenmann | 404/73 |
| 4,683,824 | 8/1987 | Gibbs | 102/436 |
| 4,783,672 | 11/1988 | Wirtz et al. | 354/21 |
| 5,038,359 | 8/1991 | Pepper et al. | 372/99 |
| 5,069,577 | 12/1991 | Murphy | 404/11 |
| 5,084,883 | 1/1992 | Khalid et al. | 372/24 |
| 5,159,560 | 10/1992 | Newell et al. | 364/479 |
| 5,206,869 | 4/1993 | Khalid et al. | 372/24 |
| 5,325,243 | 6/1994 | Rath et al. | 360/71 |
| 5,491,586 | 2/1996 | Phillips | 359/530 |
| 5,638,228 | 6/1997 | Thomas, III | 360/60 |
| 5,650,891 | 7/1997 | Thayne et al. | 360/99.06 |

FOREIGN PATENT DOCUMENTS

| | | |
|---|---|---|
| 2135059 | 1/1973 | Germany . |
| 61650 | 2/1992 | Japan . |
| 167286 | 6/1992 | Japan . |
| 168540 | 6/1994 | Japan . |

OTHER PUBLICATIONS

Jacobs, S.F., "Experiments with retrodirective arrays", *Optical Eng.*, 1982, 21, 281–283.

Rennilson, J., "Retroflection—What is it and how is it used", *ASTM Stand. News*, 1982.

Sugawara, Patent abstracts of Japan, 18, Feb. 10, 1994, Appl. No. 4–113,999.

Venable, W.H. et al., "Factors affecting the metrology of retroreflecting materials", *App. Optics*, 1980, 19, 1242–1246.

Walker, J., "The amateur Scientist: Wonders with the retroreflector, a mirror that removes distortion from a light beam", *Scientific Am.*, 1988, 258, 118–123.

U.S. application No. 08/866,189, Sounderegger et al., filed May 30, 1997.

Patent Abstracts of Japan, Apr. 30, 1996, 096(004), JP 07 334920A, published Dec. 22, 1995, 1 page.

*Primary Examiner*—W. Chris Kim
*Attorney, Agent, or Firm*—Woodcock Washburn Kurtz MacKiewicz & Norris LLP

[57] ABSTRACT

An improved disk cartridge has a light emitter and a light detector and a baffle plate disposed between the emitter and the detector. The detector functions to denote the presence of reflected light from a retroreflective marker disposed on a disk cartridge. The baffle plate acts as a filter to minimize the amount of light reflected from sources other than the retroreflective marker that is received by the detector. By minimizing the amount of light seen by the detector from sources other than the retroreflective marker, the retroreflective marker on a disk cartridge can be placed in close proximity to the emitter and detector. It is advantageous for a disk drive of compact design, such as those within a lap top computer.

20 Claims, 14 Drawing Sheets

FIG. 10
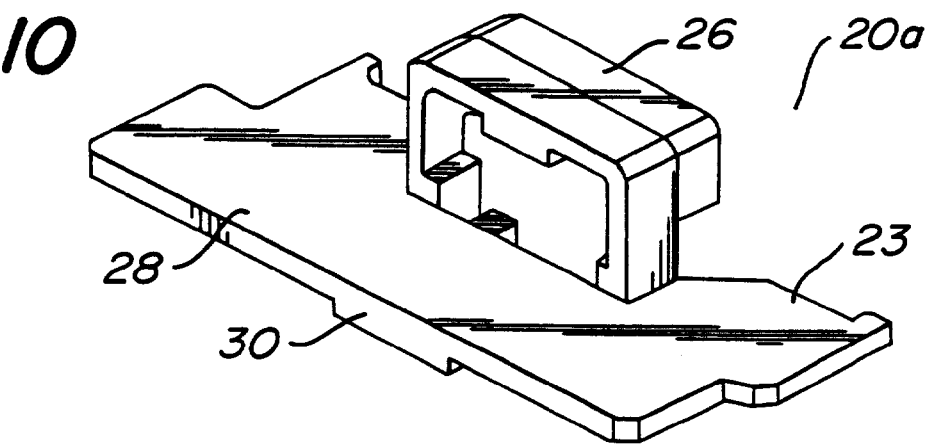
FIG. 11
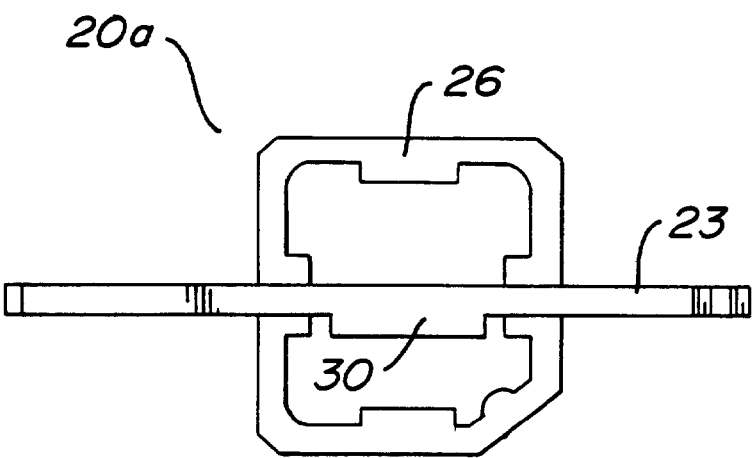
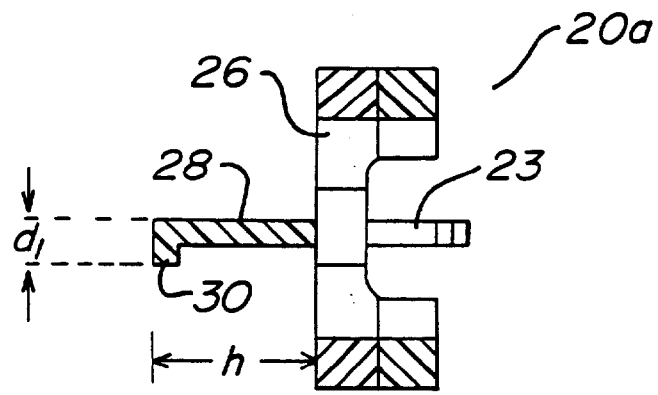
FIG. 12

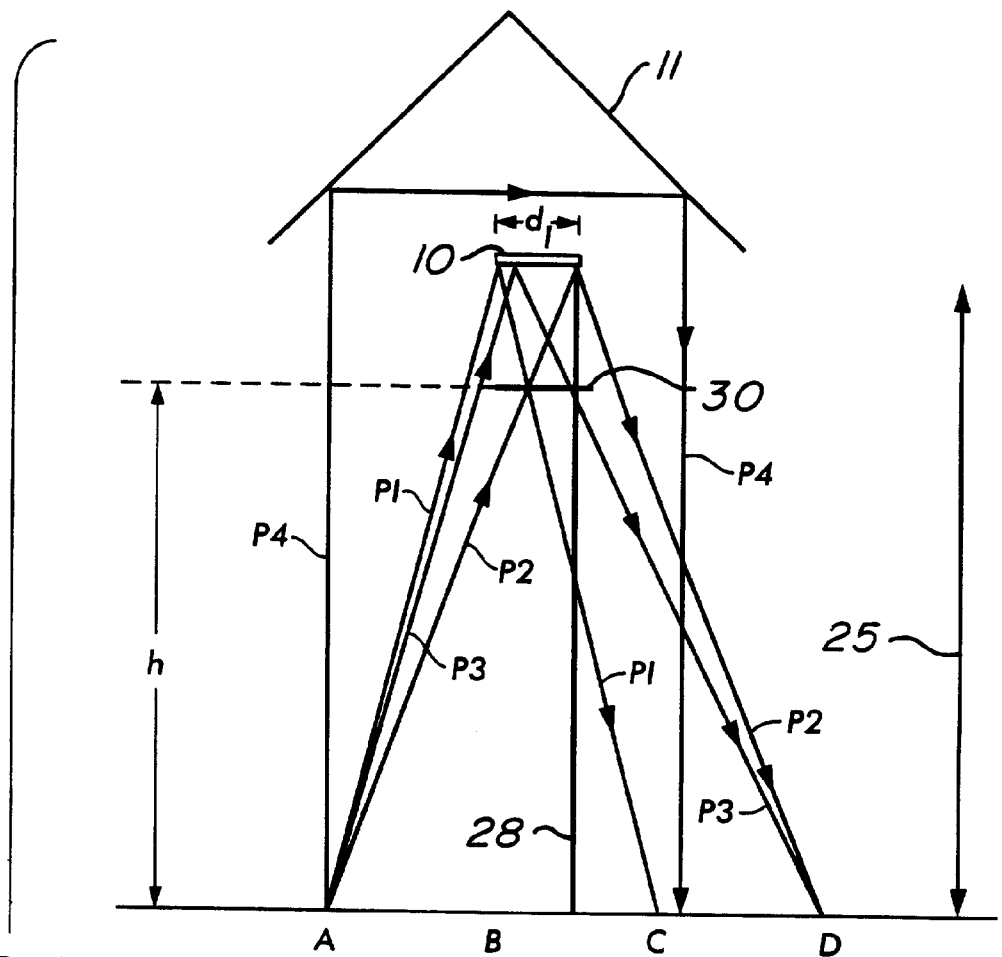
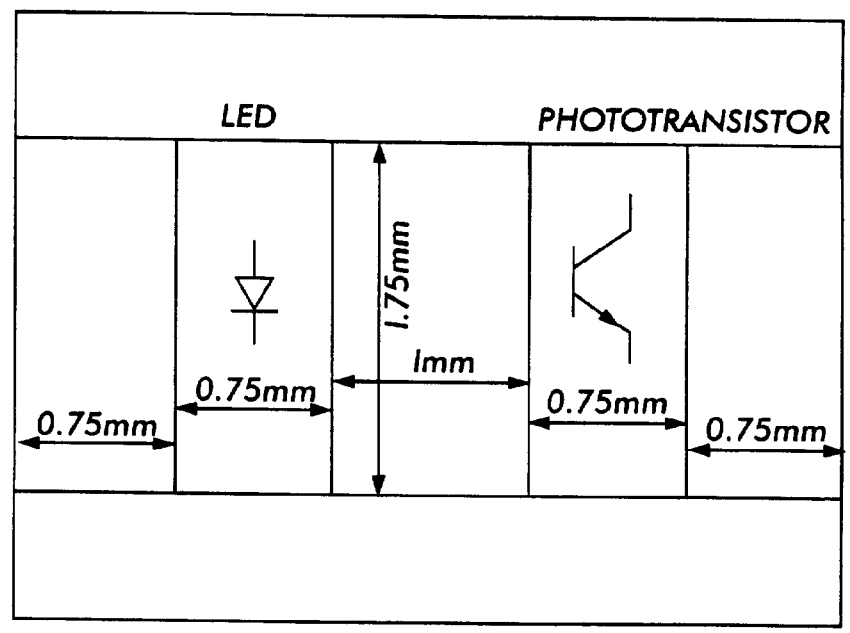
FIG. 14

DISK DRIVE FOR DETECTING A RETROREFLECTIVE MARKER ON A DATA STORAGE CARTRIDGE

This application is a continuation-in-part application of U.S. patent application Ser. No. 08/833,032 filed on Apr. 3, 1997 U.S. Pat. No. 5,986,838 entitled "Thin Retroreflective Marker For Data Storage Cartridge" which is a continuation of U.S. patent application Ser. No. 08/388,242 filed on Feb. 14, 1995, entitled "Retroreflective Marker For Data Storage Cartridge" now U.S. Pat. No. 5,638,228. This application claims the benefit of the filing date of both of these applications and hereby incorporates by reference the contents of these documents.

BACKGROUND OF THE INVENTION

The present invention relates to an improved disk drive that has an improved means for determining whether a correct data storage cartridge has been inserted into the disk drive and thereby protecting the disk drive against the insertion of incompatible or write protected disk cartridges in the drive. More particularly, the present invention relates to improved method and apparatus for determining whether a data storage cartridge that has a retroreflective marker has been inserted into the disk drive.

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge. The outer shell of the cartridge typically has some form of opening near its forward edge to provide the recording heads of the drive with access to the recording surfaces of the disk. A shutter or door mechanism is often provided to cover the opening when the cartridge is not in use to prevent dust or other contaminants from entering the cartridge and settling on the recording surface of the disk.

As used in this application the term disk cartridge refers to any data storage device including tape drives.

Disk drives for receiving removable disk cartridges, including conventional 3.5" floppy disk drives, must have some mechanism for detecting the insertion or presence of a disk cartridge in the drive. The actuator that carries the recording heads of the disk drive across the recording surfaces of the disk should not be allowed to move unless the presence of a disk cartridge is detected. In the prior art, mechanical switches are typically employed to detect the presence of a disk cartridge within the drive. Such switches are typically positioned such that when a disk cartridge is inserted fully into the drive, the cartridge contacts the switch, thereby providing an indication that the disk cartridge is present.

When a data storage cartridge is inserted into a drive it is important that the type of cartridge be recognized by the drive as the correct type for safe and reliable use in that particular drive. Most removable cartridge drives (magnetic and optical) typically use approximately the same form factor cartridges, i.e., 3.5", 5.25", etc. Hence if one of these cartridges is inserted into the cartridge slot of the non-mating drive there is a large probability that either the drive (heads, load mechanism, electronics, etc.) or the data on the disk could be damaged.

Also, some cartridges are "write protected" by the user to prevent accidental erasure of important data by writing over it. It is important to protect against operation of the drive when an incorrect or write protected cartridge is inserted.

Retroreflective materials have been developed. This material has many periodic miniature corner cubes, or spherical elements, which reflect light striking it almost exactly upon its incident path. Retroreflective array materials are described in Jacobs, S. F., "Experiments with retrodirective arrays," *Optical Engineering*, Vol. 21, No. 2, March/April 1982; Rennilson, J., "Retroreflection—What is it and how is it used?" *ASTM Standardization News*, February 1982; and Venable, W. H., Stephenson, H. F. and Tersteiege, H., "Factor affecting the metrology of retroreflective materials," *Applied Optics*, Vol. 19, No. 8, April 15, 1980.

Recently issued U.S. Pat. No. 5,638,228 (the '228 patent), which issued on Jun. 10, 1997 is commonly assigned and has the same inventor, is hereby incorporated by reference. The '228 patent describes a disk cartridge that has a retroreflective material and a disk drive that has a light emitter and a light detector coupled to an electrical circuit that can be used to determine if the correct disk cartridge has been inserted into the disk drive. The emitter and detector determine if the correct data storage cartridge has been inserted into the disk drive by determining whether a data storage cartridge that has a retroreflector has been inserted into the disk drive. As described in the '228 patent, the magnitude of light reflected from a retroreflector to the detector will be greater than that reflected by a spectrol (mirror like) or diffuse deflector. Therefore, the detector can determine that a disk cartridge that has a retroreflective marker has been inserted into the disk drive when the magnitude of light received is above a predetermined threshold. Since the magnitude of light reflected from a spacial or diffuse reflector will not exceed the predetermined threshold, the detector will know that an improper data storage cartridge has been inserted when the magnitude of light received does not exceed the predetermined threshold.

By recognizing that the magnitude of light received is above a preset threshold limit, the detector knows that the light has been reflected by a retroreflector, and that the correct disk cartridge has been inserted into the disk drive. After recognizing this, the detector operates in conjunction with an electrical circuit to permit activation of the heads of the disk drive, so that the disk drive can interface with the disk cartridge is inserted into a disk drive, the detector will not see light emitted from a retroreflector. In this event, the detector and the electrical circuit will not enable the heads of the disk drive. This prevents the disk drive from operating.

While the emitter detector design disclosed in the '228 patent has proven to be effective for some disk drives, an improved design is needed, as disk drives become smaller and smaller in order to meet design constraints, in for example a lap top computer, the distance between the emitter detector pair and the retroreflective marker on a disk cartridge becomes smaller and smaller. Due to present design constraints, the distance between the emitter detector pair and the retroreflective marker on a disk cartridge has become so small, that the design disclosed in the '228 patent cannot be used to effectively distinguish between light reflected from a retroreflective surface and light reflected form other surfaces, such as a spacial or diffuse reflectors. At these small distances, the difference in the amount of light seen by the detector from the retroreflective marker and the amount of light seen from other sources becomes so small that it is difficult to distinguish between the sources.

Consequently, the detector cannot effectively distinguish between light that has been reflected from other surfaces and light that has been reflected from a retroreflective marker.

This invention relates to an improved disk drive that has an improved emitter/detector that can be used to distinguish between light reflected from a retroreflective marker on a disk cartridge and light from other reflective sources. This improved emitter/detector can effectively distinguish between light reflected from a retroreflective marker and other reflective sources when the distance between the emitter/detector and the reflective material is relatively very small. This improved disk drive will also improve the ability to distinguish between light reflected from a retroreflective marker and light reflected from other sources, such as diffuse or specular surfaces, in disk drives having a relatively high distance between the marker and the detector.

SUMMARY OF THE INVENTION

In determining whether a data storage cartridge has a retroreflective marker. This baffle is preferably disposed between the emitter and the detector. The emitter, detector and baffle make this distinction between light reflected from a retroreflective marker on a disk cartridge and light reflected from other sources.

The disk drive of this invention may further include a circuit that operates in conjunction with the emitter/detector and the disk drive heads disposed in the disk drive. When a disk cartridge is inserted into the disk drive, the disk drive heads are held in a retracted position. If a proper disk cartridge is detected by the detector, the electrical circuit sends a signal to a microprocessor that permits the heads to move from the retracted position to interface with the data storage cartridge. Thus, if the detector determines that a data storage cartridge that has a retroreflective marker has been inserted into the disk drive, the detector and the electrical circuit function to enable the disk drive to interface with data storage cartridge. In contrast, if a data storage cartridge that does not have a retroreflective marker is inserted into the disk drive, the detector and the electrical circuit prevent operation of the disk drive heads and electrical communication between the disk drive and the data storage cartridge.

The emitter, the detector and the baffle determine whether a data storage cartridge that has a retroreflective marker has been inserted into the disk drive as follows. Light is emitted from the emitter and reflected off of the disk cartridge to the detector. The detector notes the presence of the reflected light from the retroreflective marker on the disk cartridge and from other sources. The baffle functions to block significantly more of the light that is reflected from other reflective sources (spectrol and diffuse). By blocking some of the light reflected from these other sources, the relative amount of light seen by the detector from the retroreflective marker increases. In other words, by blocking the amount of light reflected from other sources, the detector sees relatively more light reflected from the retroreflective marker. Because of this increase in the difference between the light reflected from the retroreflective marker and from other sources, the detector is now able to more effectively distinguish between light reflected from the marker and from other sources.

In a preferred embodiment of this invention, the baffle is disposed between the emitter and the detector and has a wall and a tongue that blocks significantly more light reflected from reflective sources other than the retroreflective marker and blocks significantly more light that if not inhibited would be reflected by a diffuse or a spectrol reflector. The wall extends substantially perpendicular from the emitter/detector. The wall of the baffle functions to inhibit light reflected from spectoral and diffuse sources to a greater degree than it does light reflected from a retroreflective marker. The wall may also inhibit some light rays emitted from the emitter from reaching the detector by blocking them before they are reflected. The tongue extends substantially perpendicular from the wall of the baffle in the direction of the emitter. The tongue primarily prevents light from reaching the detector that would have been reflected from either a spectoral or diffuse reflector. To a lesser extent, the tongue also inhibits reflected light from either spectoral or diffuse reflectors.

In an alternative embodiment of this invention, the disk drive can determine whether a data storage cartridge that is write protected has been inserted into the disk drive. A data storage disk that is write protected may have a similar retroreflective marker to denote that it is write protected. This can be determined with the emitter, detector and baffle described above and communicated through an electrical circuit to a microprocessor which controls the read and write functions of the disk drive. The microprocessor can then function to prevent the heads from trying to write to the write protected data storage cartridge.

Preferably, the disk drive of this invention is installed in a lap top type computer. However, it may be a "stand alone" type disk drive or a standard personal computer that has a disk drive.

The foregoing and other objects, features and advantages of the invention will be better understood from the following more detailed description and appended claims.

BRIEF DESCRIPTION OF THE DRAWINGS

FIG. 10 is an isometric view of the detection device of this invention;

FIG. 11 is top view of the detection device of FIG. 10;

FIG. 12 is a cross sectional view of the detection device of FIG. 10;

FIG. 14 illustrates the operation of the detection device of FIG. 10;

DESCRIPTION OF THE PREFERRED EMBODIMENTS

Figure 1:
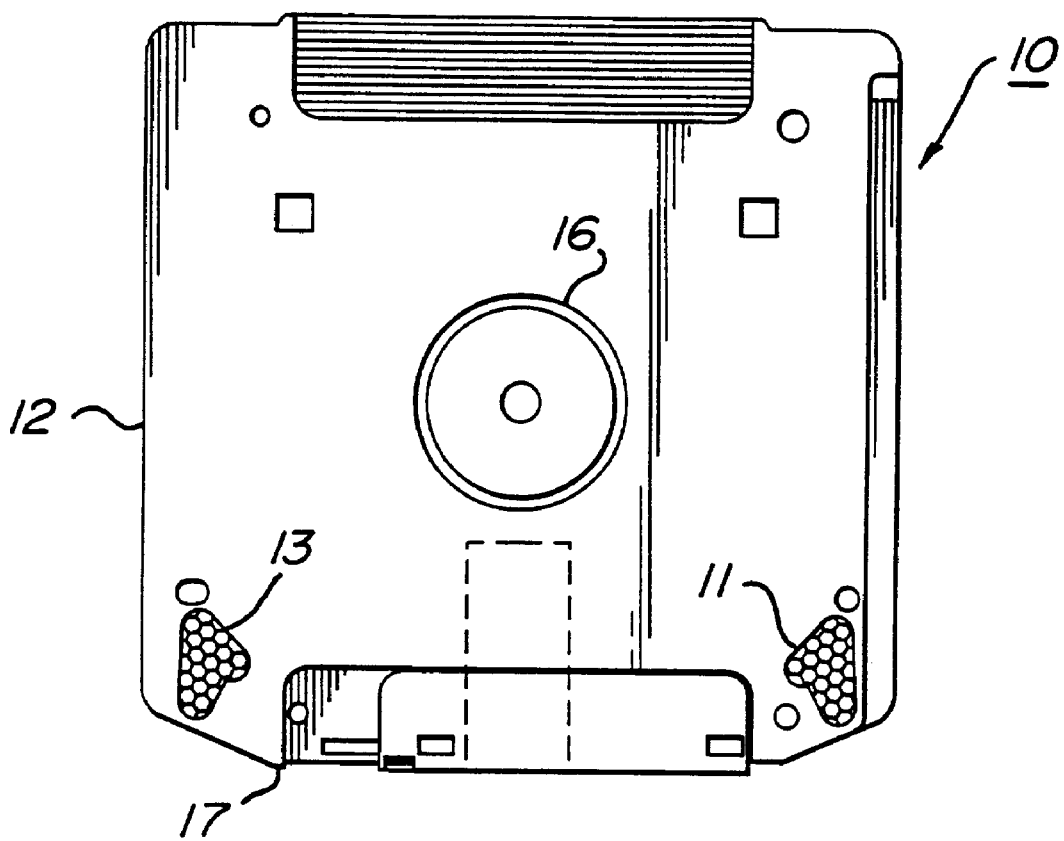
FIG. 1 shows a data storage cartridge that can be used with a disk drive of this invention.
Figure 2:
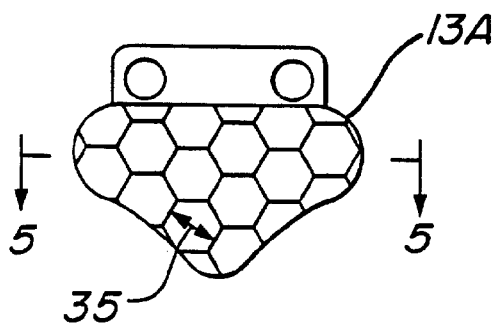
FIGS. 2, 3 and 4 are plan, top and edge views respectively of a portion of the data storage cartridge of FIG. 1.
Figure 3:
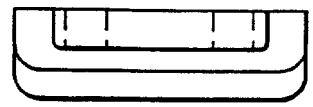
Figure 4:
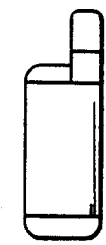
Figure 5:
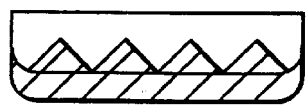
FIG. 5 is a section on the section line 5—5 of FIG. 4.

FIG. 1 illustrates a data storage cartridge that can operate in accordance with the present invention. This data storage cartridge is described in commonly assigned U.S. Pat. No. 5,650,891 entitled "Apparatus for Performing Multiple Functions in a Data Storage Device Using a Single Electro-Mechanical Device," issued on Jun. 22, 1997 (Attorney Docket No. 8906), which is hereby incorporated by reference.

The disk cartridge 10 comprises an outer casing 12 having upper and lower shells that mate to form the casing. A disk-shaped recording medium is affixed to a hub 16 that is rotatably mounted in the casing 12. An opening on the bottom shell of the casing 12 provides access to the disk hub 16. A head access opening in the front peripheral edge 17 of the disk cartridge 10 provides access to the recording surfaces of the disk by the recording heads of a disk drive.

In accordance with the present invention, a retroreflective marker, or tag, 11 is positioned on the cartridge to be detected by the detector in the disk drive. A write protected marker 13 of retroreflective material may be applied to the cartridge if it is "write protected."

The markers 11, 13 may be an acrylic retroreflective marker, as shown in FIGS. 2–5. These markers are an array of retroreflective corner cubes whose pitch and flat-to-flat distance is slightly greater than the distance between the emitter/detector (E/D) pair of the disk drive described below that is used to sense the markers. The pitch on the marker's corner cubes is preferably 94 mils. The emitter described below may be spaced about 70 mils from the phototransistor in the E/D pair.

The ability to sense the tag or marker stems from the fact that each corner-cube element of the marker, of which there are preferably nine, reflect the diffuse light incident on them back at the emitter and the detector with an illuminance profile that is annular. If a retroreflector has a size (diameter) which is slightly greater than 70 mils, i.e., 94 mils, the returned light distribution from each retroreflective element will have a donut shaped distribution around the center of the emitter. The donut's radius will about 94 mils. A segment, or lobe, of this donut illuminates the detector 22. The marker may also be made of Reflexite.

In a preferred embodiment of this invention the disk drive 18 has a detection device 20a, an electrical circuit 20b and a head retraction system 42. This embodiment of this invention is described with reference to FIGS. 6–8. The head retraction system and other components of this disk drive 18 are described in commonly assigned co-pending application entitled "An Improved Operating System For Operating An Eject System And A Head Retraction System of A Disk Drive," Ser. No. 08/866,189 filed May 30, 1997 (Attorney Docket No. IOM-9460). This application is hereby incorporated by reference.

Figure 9:
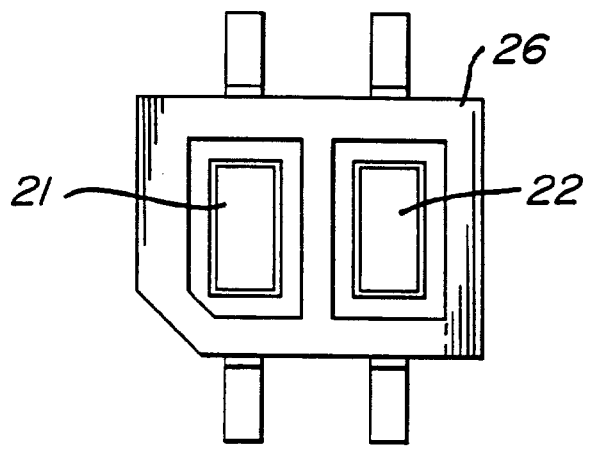
FIG. 9 is a top view of an emitter and a detector that can be used with this invention.

In accordance with the present invention, the detection device 20a includes an emitter/detector pair 21, 22 and a baffle 23 (FIG. 9) that are positioned in the drive 18 to detect the retroreflective marker 11 or the marker 13 and to unlock the heads on the actuator. The emitter/detector pair includes a LED light source 21 and a detector 22.

The emitter 21, detector 22 and the baffle 23 are preferably disposed on a printed circuit board 24 (PCB). This PCB 24 is preferably connected to the disk drive and the emitter and detector respectively emit and detect light through slots in the chassis of the disk drive. A suitable emitter/detector is commercially available, for example, from Sharp Corporation and designated Model No. GP 2S27.

The detector 22 is closely spaced to the LED emitter 21. Therefore, the detector 22 will optimally respond to light which is emitted from the source 21, and reflected from the retroreflective material in the marker 11, and is incident upon the detector 22 along the same wave path that the light was emitted. The spacing between the marker and the emitter and detector is denoted by the arrow 25. In a preferred embodiment, the length of the arrow is approximately 3.35 mm.

Illustrated in FIGS. 10–12 is a preferred embodiment of the emitter 21, detector 22 and the baffle 23 of this invention. As shown in these figures, the emitter 21 and the detector 22 are disposed in a housing 26. Disposed on the housing 26 is the baffle 23. The baffle 23 may be constructed from plastic or from another material, such as metal. The baffle 23 is preferably connected to the housing 26 by any one of a number of fastening techniques including soldering. The baffle 23 may be configured so as to snap on to the housing 26. The baffle 23 includes a wall 28 and a tongue 30. The wall 28 preferably extends perpendicular to the housing 26 and is disposed between the emitter 21 and the detector 22. The tongue 30 is connected to the wall 28 and preferably extends from the top of the wall 28 towards the emitter 21. In a preferred embodiment of this invention, the tongue 30 extends perpendicular to the wall 28. The baffle and the emitter detector housing could be a single molded piece.

In a most preferred embodiment, the distance denoted as $d_1$ of the tongue 30 is equal to about 0.7 mm., as shown in FIG. 14. The height of the wall, denoted as h, is preferably 2.4 mm. The closest reflective surface to the detector is about 3.35 mm. Although these are the preferred dimensions of the baffle 23, various combinations of the height and the distance $d_1$ can be used to accomplish the same result. For example, if the height h is greater, a smaller distance $d_1$ can be used, and if the height h is smaller, a greater distance $d_1$ can be used.

Figure 13:
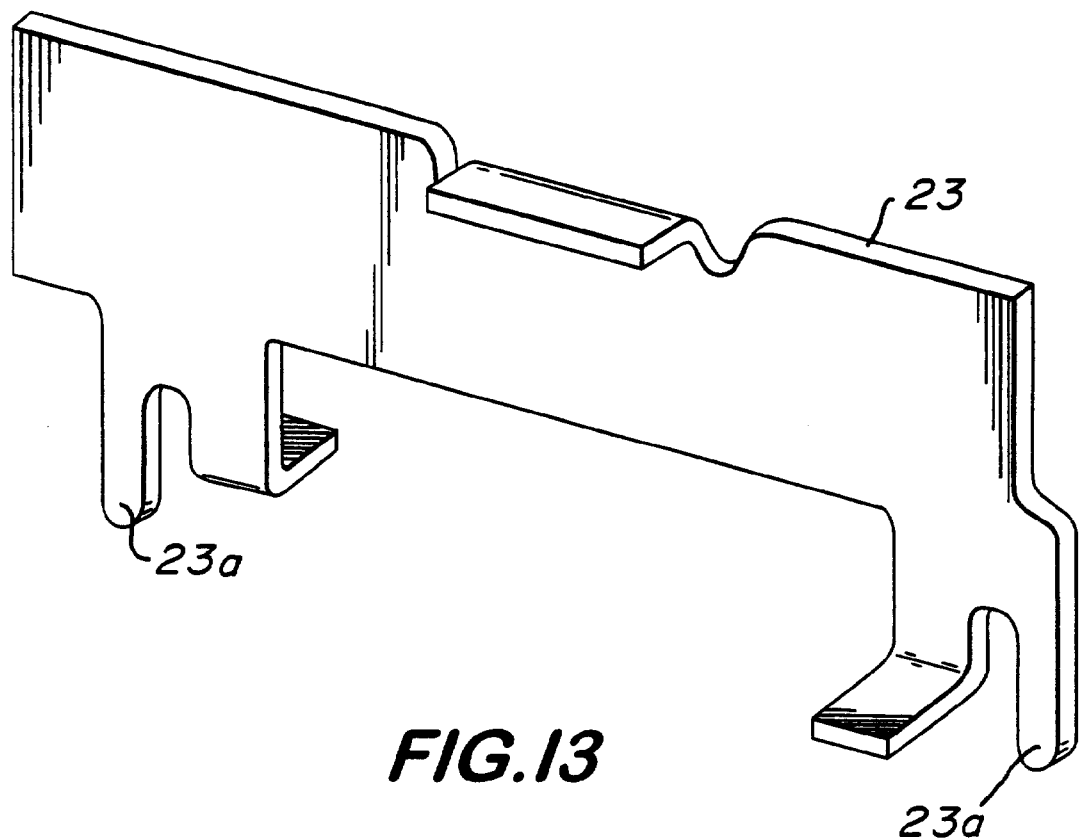
FIG. 13 is an isometric view of another preferred embodiment of a component of the detection device.

FIG. 13 illustrates another preferred embodiment of the baffle 23. In this embodiment, the legs 23a of the baffle are soldered to a PCB in the disk drive. Similar to the first embodiment, the baffle 23 has a wall 28 and a tongue 30.

There is a certain tongue length for a given wall height to which essentially no light from the front surface of the cartridge with is reflected specularly (Snell's law governed) will enter the aperture of the detector upon reflection. One will also find that there is for the same wall height a slightly longer tongue length which will inhibit any diffuse reflection for the same geometrically positioned surface from entering the aperture of the detector upon reflection. If this tongue length is less than the flat-to-flat distance of the hexagonal corner cube element (retroreflective element) and the corner cube element is aligned appropriately, some reflection from the corner cube will enter the aperture of the detector. If the tongue length needed is less than ½ the flat-to-flat distance the relative alignment between the retroreflective elements and the emitter detector pair and the light baffle becomes significantly less critical. Also the emitter (LED) used in conjunction with this invention must have an output divergence angle which is large enough, or directed in such a manner such that a significant portion of the energy is spread over an area outside the confines baffle tongue dimensions projection in space. The Full Width Half Maximum (FWHM) point for the source radiation distribution (LED) is on the order of 40 to 60 degrees for the LED used in this embodiment of the invention. In a preferred embodiment, the tongue length is limited to about ⅓ of the flat-to-flat distance of the corner cube or about 0.75 mm such that alignment of the emitter detector pair to the retroreflective cartridge marker is not critical to better than +/−1 mm. One will note from FIG. 17, described below, that for the case illustrated, the positional insensitivity (with baffle features this size) allows for a better than 5:1 discrimination ratio even with misalignments as large as +/−4.0 mm.

FIG. 14 depicts schematically how the baffle 23 functions to reduce the amount of light reflected from the diffuse and specular reflectors to the detector 22. As shown, the light ray designated as P1, is inhibited from reaching the edge of the detector. Light Ray P1 is not seen by the detector 22 because upon reflection the light ray hits the tongue 30 of the baffle 23 and is thereby inhibited from reaching the detector 22. Similarly, the specular light ray denoted as P2 is not seen by the detector 22. This light ray hits the tongue 30 of the baffle 23 before it is reflected. Therefore, it never reaches the detector 22. This light ray P2 would have been a specular reflection and not a light ray that would be reflected by the retroreflective marker 11. These light rays P1, P2 are discussed for illustrative purposes. Similar light rays will not reach the detector 22 as they will be blocked by the tongue 30 and the wall 28 of the baffle 23.

Light ray P3 illustrates the limiting diffuse reflection case. As is illustrated, light ray P3 is prevented from reaching the detector 22 by the tongue 30 of the baffle 23a. In other embodiments, the light ray P3 could be blocked by the tongue upon emission before it reaches a reflective source.

A light ray P4 reflected from the retroreflective marker is also shown in FIG. 13. As shown, light ray P4 reflects into the detector 22 and is not inhibited by the baffle 23.

Light ray P3 in FIG. 14 illustrates the limiting diffuse reflection case. Starting at the far edge of the detector aperture (point D) one sends a light ray back over the top edge of the baffle wall height. This ray strikes the reflecting surface at some point. Using geometry one may then calculate the required tongue length to inhibit a light ray traveling from the far edge of the emitter (point A) to this limiting case diffuse reflection point. In order to keep the tongue length at about ⅓ the corner cube flat-to-flat dimension it is necessary to have the wall height be approximately 70% of the total distance between emitter/detector pair (EDP) and the reflective surface.

Because the baffle 23 blocks light rays that would be reflected from objects other than the retroreflective marker 11, the relative amount of light that the detector 22 sees from the retroreflective marker 11 relative to the light from other sources is increased. Therefore, if light at a certain intensity is seen, the detector 22 will know that it is being reflected by the retroreflective marker and that a disk cartridge 10 with a retroreflective marker 11 has been asserted into the disk drive 18.

Figure 15:
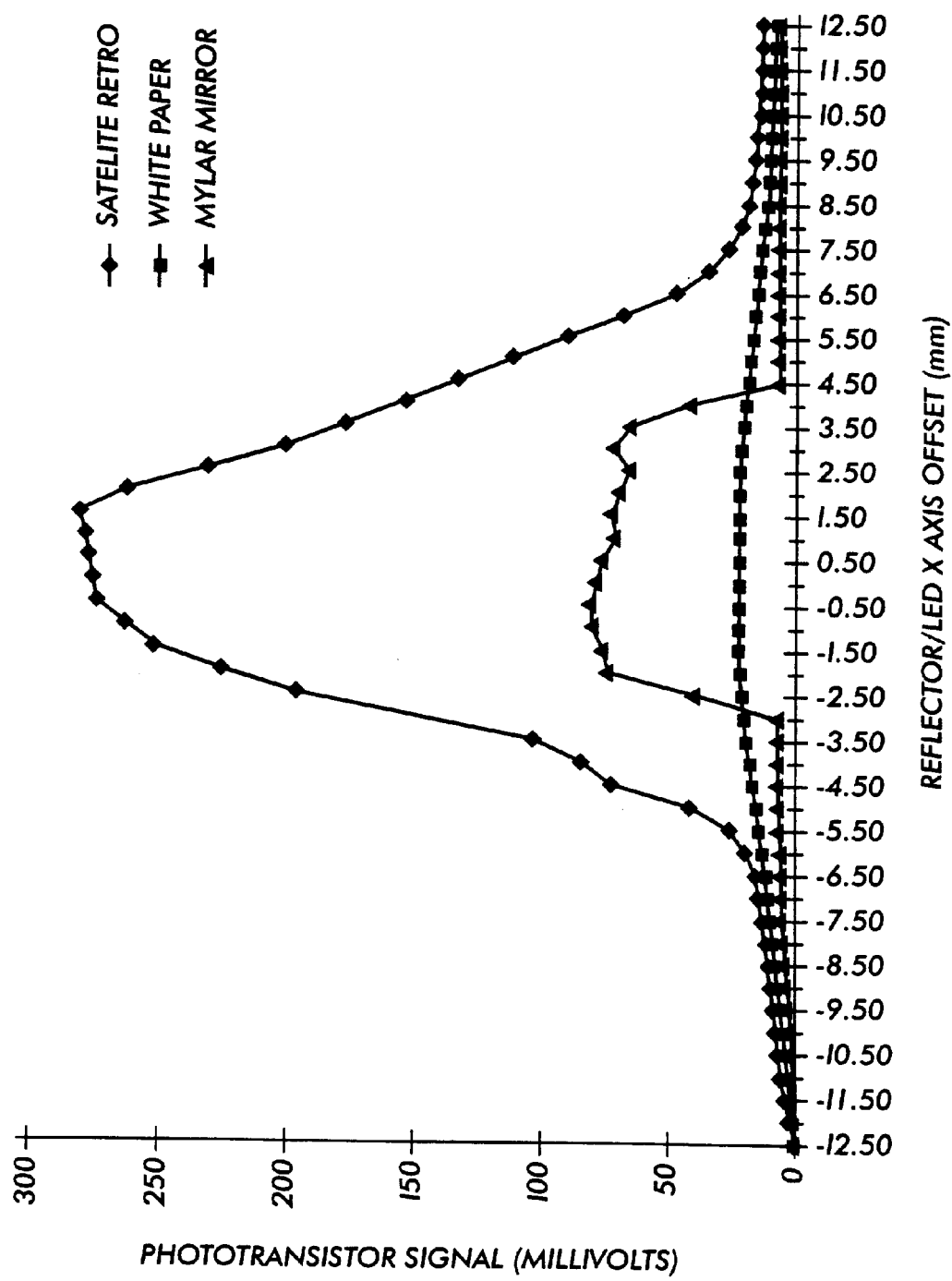
FIG. 15 is a graph depicting the operation of another detection device.
Figure 16:
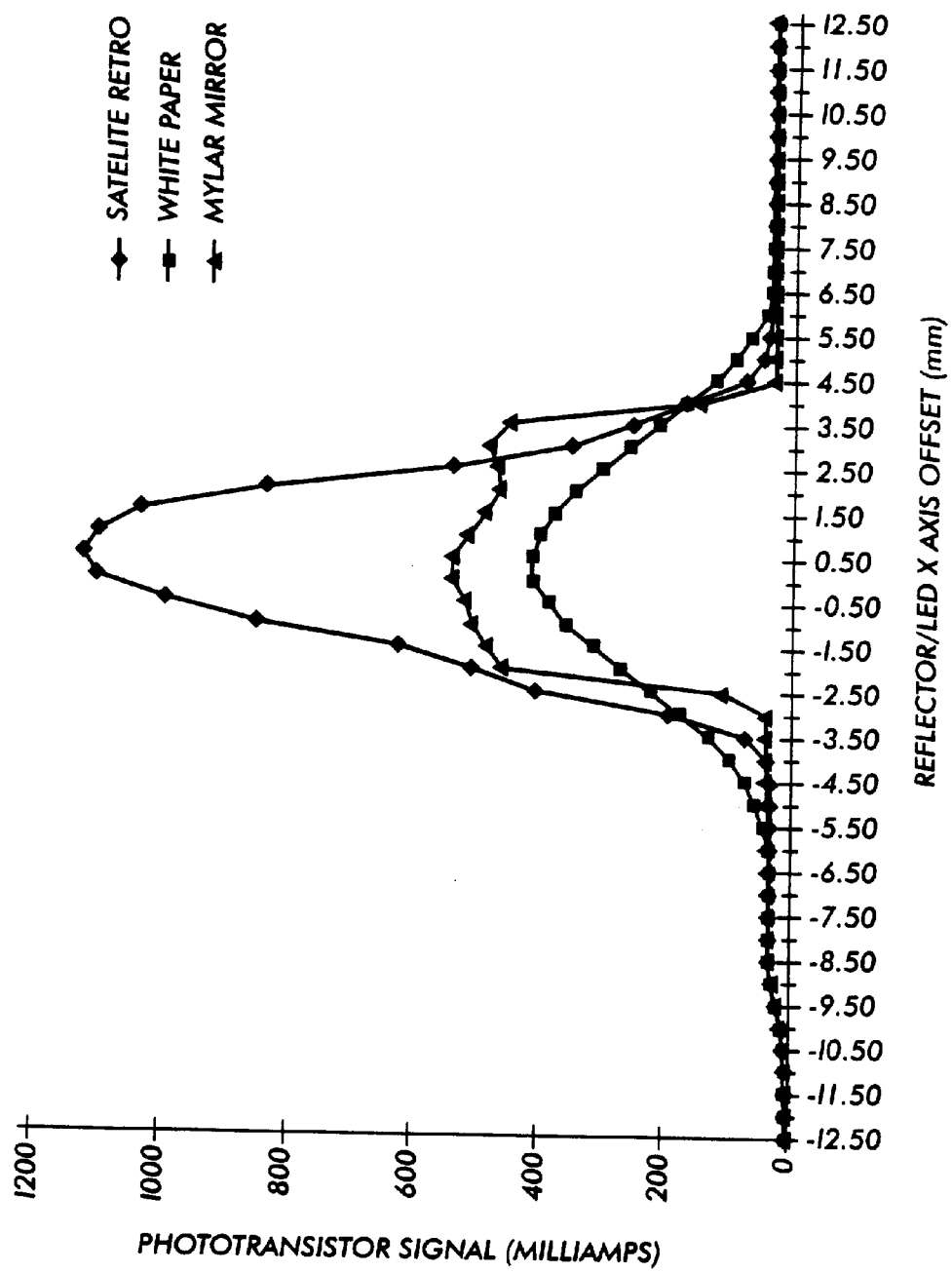
FIG. 16 is a graph depicting the need for the detection device of FIG. 10.
Figure 17:
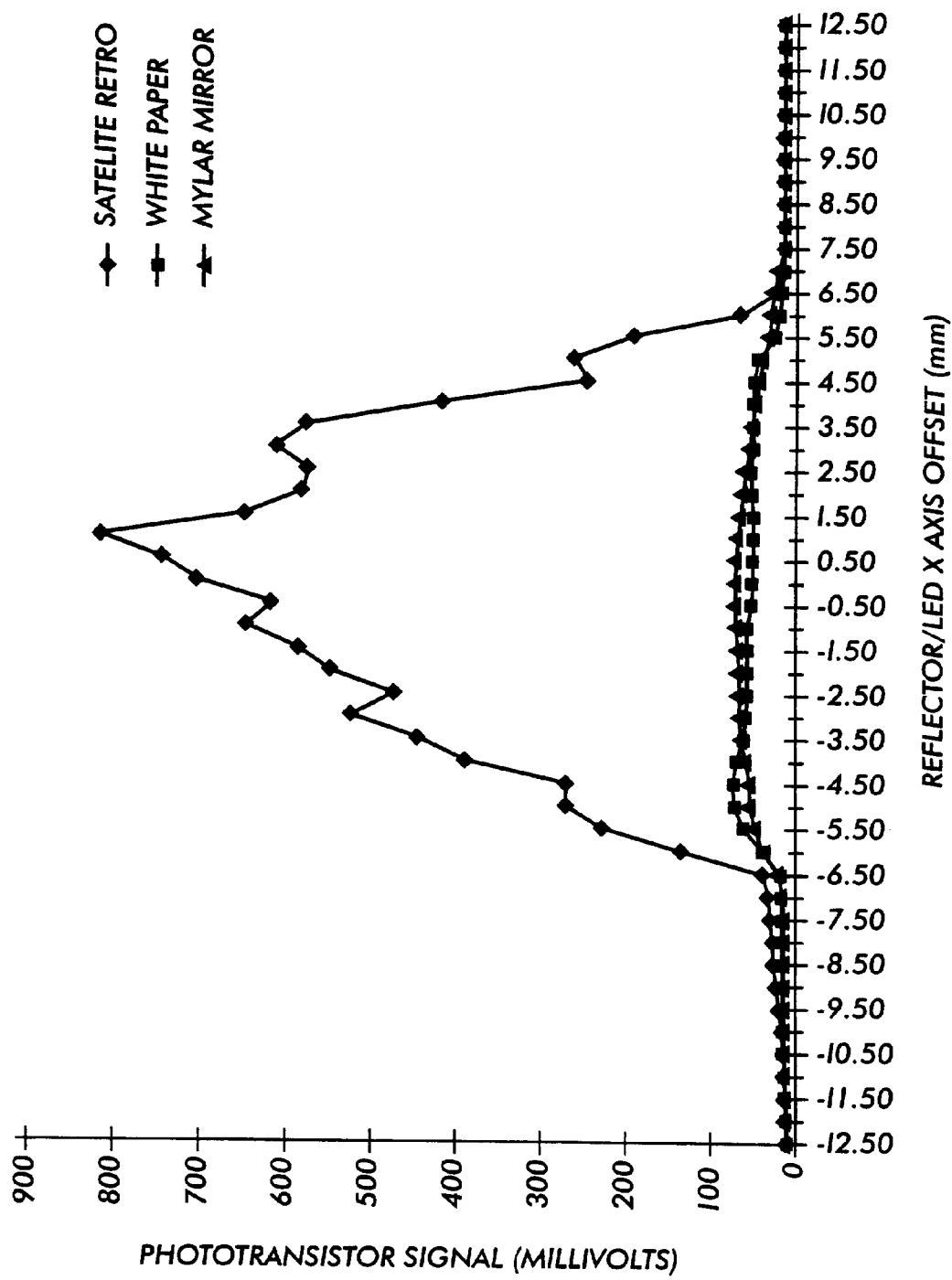
FIG. 17 is a graph depicting the operation of the detection device of FIG. 10.

A comparison of FIGS. 15–17 illustrates the importance of the baffle 23 and emitter/detector 21, 22 of this invention in determining whether a retroreflective marker is in close proximity to the detector 22. On the vertical axis of each of these graphs is the strength of the phototransistor signal or the signal at the detector 22. Along the horizontal axis is the distance that the reflector is offset from the emitter/detector 21, 22. The peak area of interest is about the 0.00 millimeter offset point along the horizontal axis because this typically the amount that the retroreflective marker is offset from the emitter 21 and detector 22. Disposed on each of these graphs are three curves. On of these curves is the amount of light reflected from a Mylar surface or mirror (spectoral). Another of the curves is the amount of light reflected from white paper (diffuse). The third curve is the amount of light seen at the detector from reflection off of a retroreflective marker.

FIG. 15 illustrates the amount of light reflected from each of these surfaces in the disk drive design disclosed in the '228 patent in which the length of arrow 24, the distance between the data storage cartridge 10 and the emitter 21 and detector 22 is about 10 mm. From this graph, it can be seen that at approximately at the 0.00 millimeter offset point the ratio of amount of light seen by the detector 22 from a retroreflective marker 11 is approximately 10 times the value of light seen at the detector 22 from reflection off a white paper surface. In addition, the amount of light reflected from a retroreflective marker 11 is about four times as great as the amount of light reflected from a Mylar type surface. Because of these ratios, the detector 22 can distinguish between light reflected from the retroreflective marker 11 as opposed to white paper or Mylar at a distance of about 10 mm. because the magnitude of light from a retroreflective marker 11 will be above a certain threshold.

FIG. 16 illustrates the amount of light seen by a detector 22 from the retroreflective marker 11, a white paper surface and a Mylar surface when the detector 22 and the marker 11 are brought in close proximity. In particular, the distance denoted by arrow 25 is about 3.3 mm. This is a design constraint of lap top type computers and for other stand alone disk drives that seek to become even more compact. As is illustrated, the ratio of the amount of light from the retroreflective marker 11 to the amount of light seen from either a Mylar type surface or a white paper surface has decreased to between a two and a half to one to a two to one ratio.

Because these ratios are much closer together, the detector 22 can no longer effectively distinguish between light reflected from the marker 11 and that from other reflective sources such as white paper (diffuse) or Mylar (spectoral).

In order to effectively distinguish between the different sources of reflected light, the baffle 23 is disposed between the emitter/detector 21, 22 as described above. FIG. 17 illustrates the amount of light seen by the detector 22 from these various sources with the detector at the same distance from the retroreflective marker 11 and other surfaces as that shown in FIG. 14, but having the baffle 23. By comparing FIG. 16 and FIG. 17, it is readily seen that at the ratio between the amount of light seen from the retroreflective marker 11 and that seen from either a white paper or a Mylar surface has increased to approximately 10 to 1. Therefore, the detector 22 can now effectively distinguish between light reflected from the marker and light reflected from a white paper or a Mylar type surface.

Figure 18:
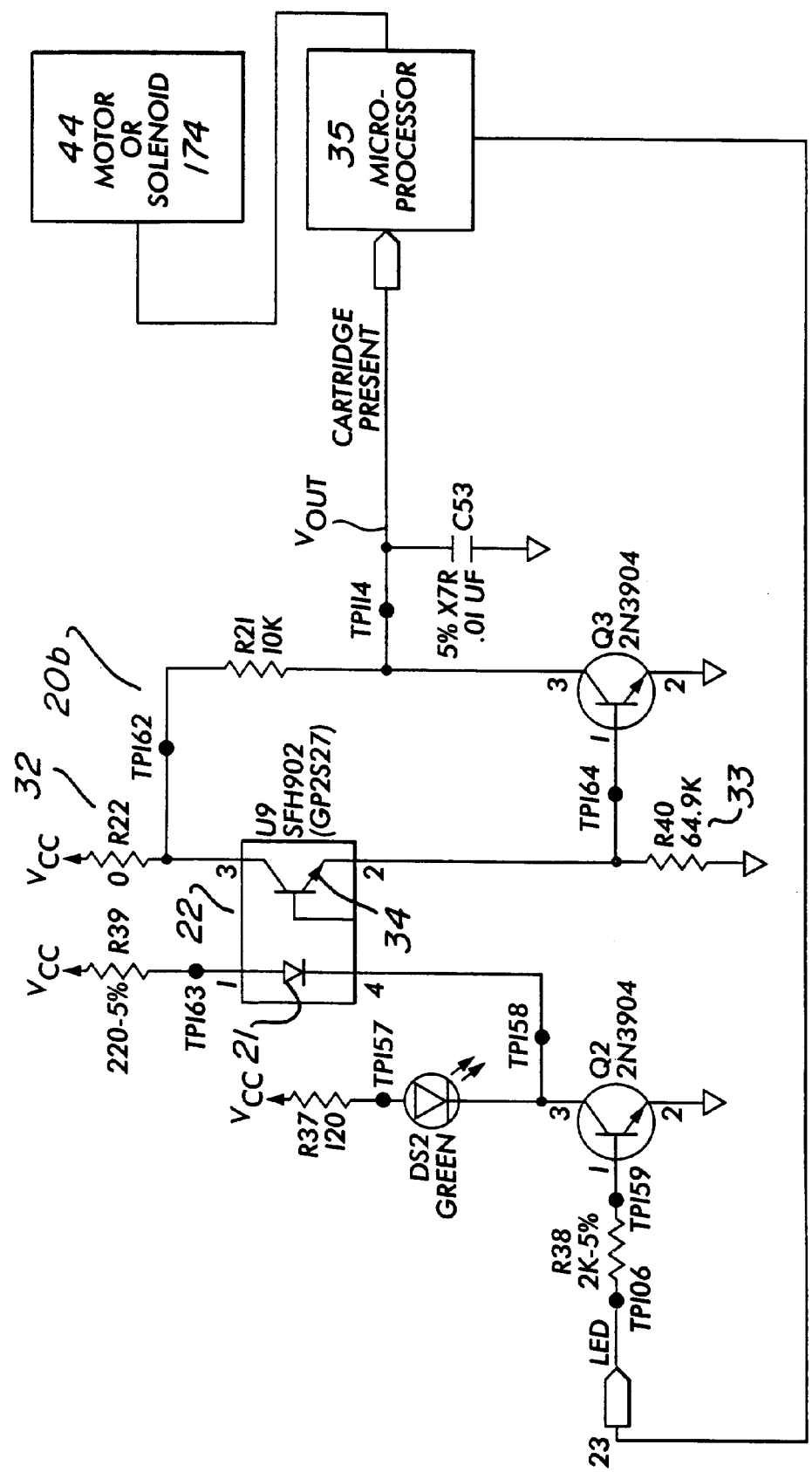
FIG. 18 illustrates the detection device of FIG. 10 in a circuit that controls the heads of the disk drive.

As is illustrated in FIG. 18, the detector 22 is part of an electrical circuit 20b that is used to control the operation of the heads. If the detector 22 detects a proper disk cartridge 10, the electrical circuit 32 sends a signal to permit the heads to interface with the data storage cartridge 10. If the proper data storage cartridge 10 is not detected, then the heads are restrained from interfacing with the inserted data storage cartridge 10 as described below. This protects the disk drive against the use of improper data storage cartridges and form writing to write protected cartridges. The electrical circuit voltage source designated as $V_{cc}$, an output voltage, designated as $V_{out}$, the detector 22, a limiting resistor 32 that limits the detector 22 voltage and a resistor 33 disposed between the detector and ground. The output voltage $V_{OUT}$ is coupled to the microprocessor. When the output voltage $V_{out}$ becomes great enough, the microprocessor permits the heads to move to interface with a disk cartridge 10. Otherwise the heads remain in the retracted position.

If a data storage cartridge 10 that does not have a retroreflective marker 11 is not inserted into the disk drive 18, then the output voltage $V_{out}$ below a threshold level. When the detector 22, determines that a data storage cartridge 10 having a retroreflective marker 11 has been inserted into the disk drive 18, the detector 22 conducts electrical current and causes the transistor 34 to conduct and the output voltage $V_{out}$ to thereby increase. This increased output voltage $V_{out}$ is sent to permit the heads to interface with the data storage cartridge 10. In the disk drive 18 described below, this is accomplished by sending a signal to the microprocessor 35, which then powers a motor to move a trolley and thereby permit the heads to interface with the disk cartridge 10, as described below.

In a most preferred embodiment of this invention, the resistor 32 is 10K and has a tolerance of +/−5%. The 2N3904 transistor 34 has a +/−50% tolerance on its Beta, the E/D pair 31 has a 2:1 range for phototransistor output current given a particular reflective target. The optical elements in the tag marker 13 have a maximum variance range of about 20% in their reflective efficiency.

Figure 6:
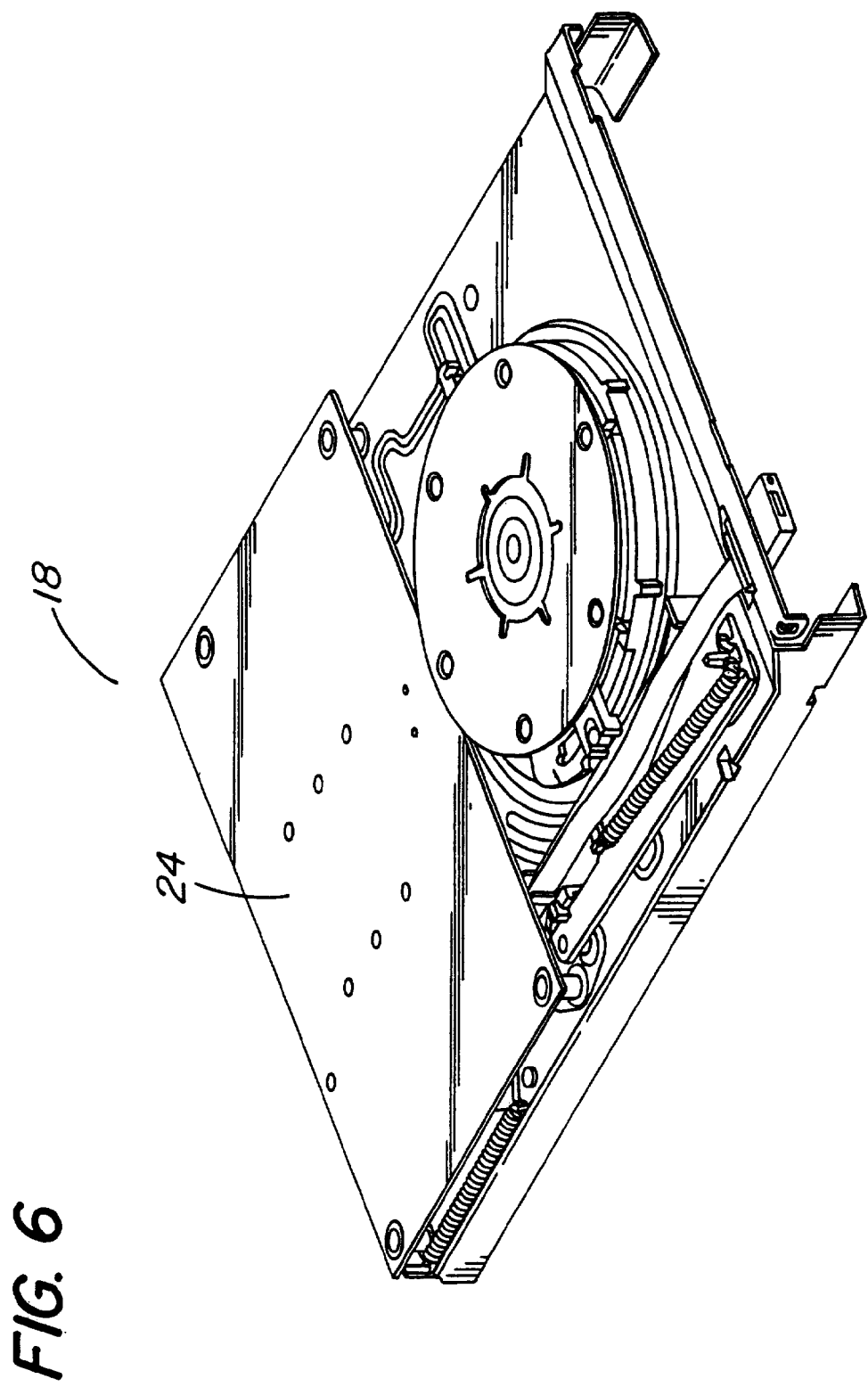
FIG. 6 is a perspective view of a disk drive of the type in which the invention is used.
Figure 7:
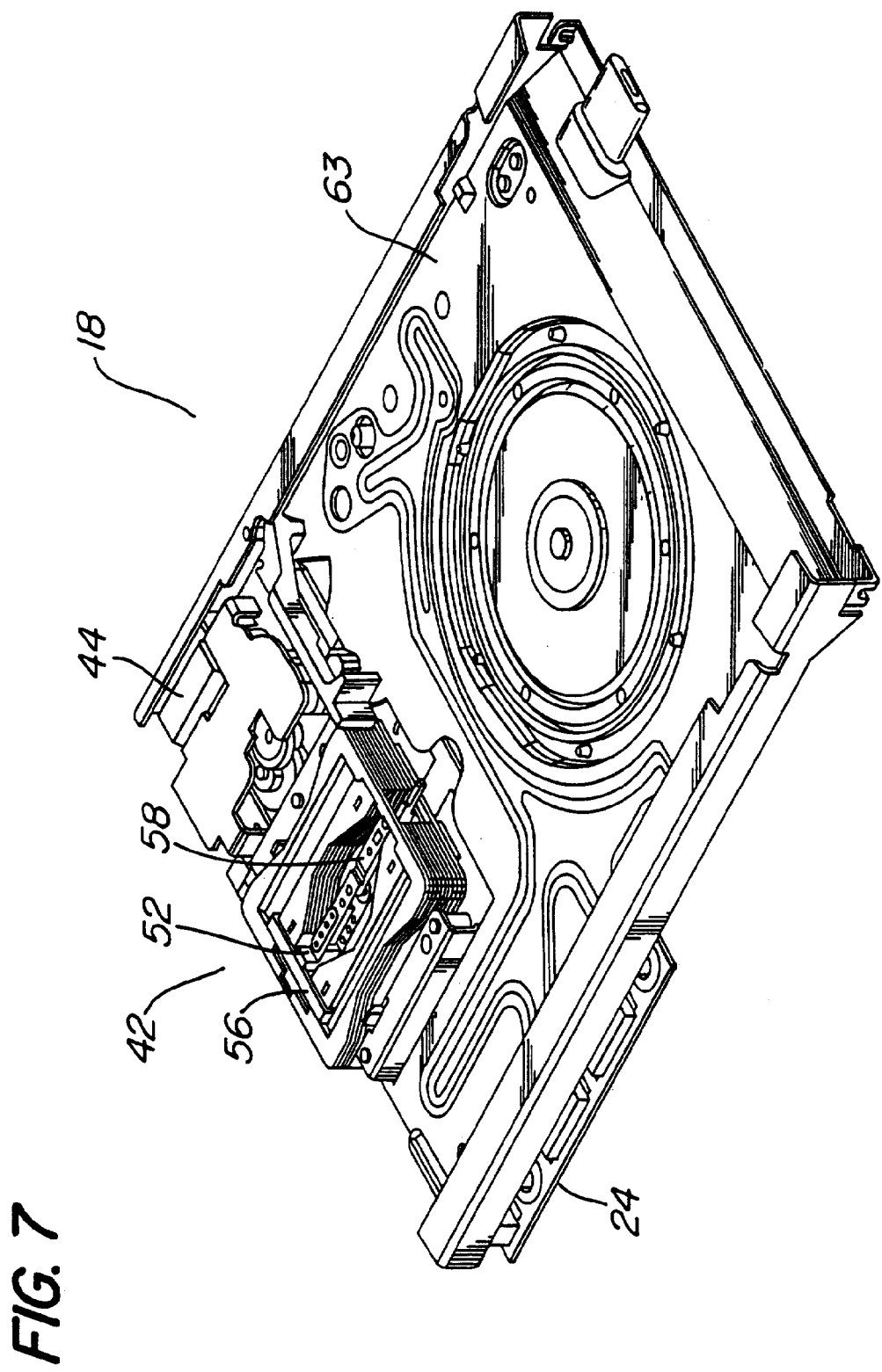
FIG. 7 is another perspective view of the disk drive of FIG. 6.
Figure 8:
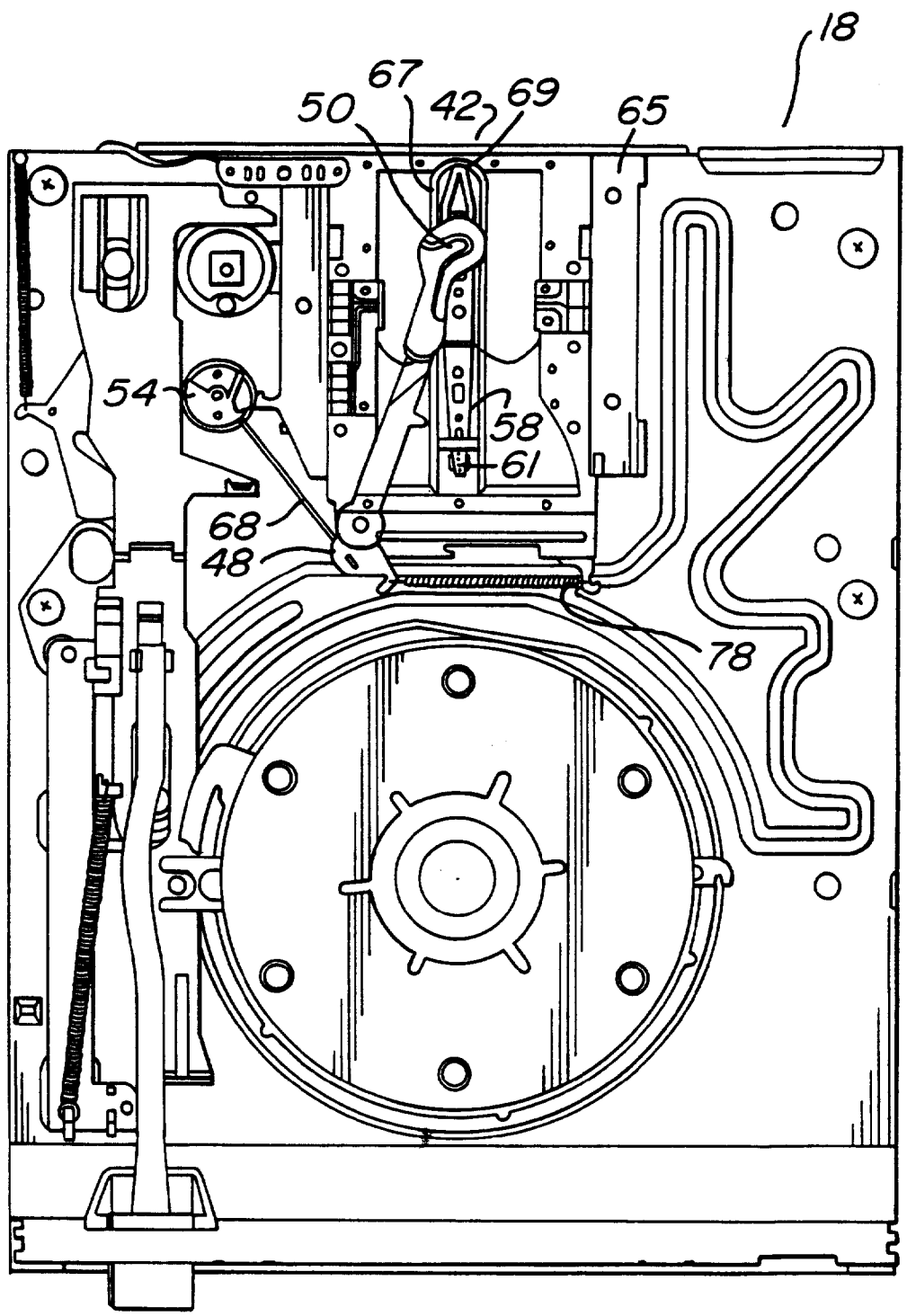
FIG. 8 is a cross sectional view of the disk drive of FIG. 6.

The head retraction system 42 of the disk drive includes a motor 44, a head crank 46, a drive link 48, a trolley 50 and a linear actuator 52, as illustrated in FIGS. 6–8. These components operate in conjunction to hold the heads in a parked position when a disk cartridge 10 is not inserted into the disk drive or if an incorrect data storage cartridge 10 is inserted into the disk drive 18.

By way of overview, the linear actuator 52 is mounted within the disk drive 18 so that it can move linearly or approximately parallel to the chassis. The linear actuator 52 includes a carriage assembly 56, a load beam 58, a head gimbel assembly and heads 61. The load beam 58 is preferably welded to the head gimbel assembly, and the heads 61 are mounted on an end of the head gimbel assembly. The load beam 58, the head gimbel assembly and the heads 61 are all mounted on the carriage assembly 56. The carriage assembly 56 is translatably mounted in the disk drive 18. In particular, the carriage assembly 56 is free to translate toward the front and the back of the disk drive 18. Preferably, the carriage assembly 56 has a rod (not shown) mounted through the assembly 56 upon which the carriage assembly 56 translates.

The head retraction system 42 preferably has a retainer 62 mounted to the underside of the chassis 63 of the disk drive 18. The retainer 62 may be affixed to the chassis 63 with a variety of known fastening techniques, including threaded fasteners. Disposed within the retainer 62 is a groove 67 running from the front of the retainer 65 to the back of the retainer 65. The carriage assembly 56 translates in this groove 67. More particularly, the carriage assembly 56 has a post 69 extending from the assembly 56 above the groove 67, down through the groove 67 and below the groove 67. In a preferred embodiment, this post 69 has a triangular cross section and a flat portion running perpendicular to the groove 67 for engagement with the trolley 50.

The head crank 46 is coupled to the motor 44 by a gearing system. The gearing system transmits power from the motor 44 to power the head crank 46.

A wire 68 or similar device is attached to the head crank 46. The wire 68 can act as a cam, as is discussed below in further detail, when the crank rotates. Because the other longitudinal end of the wire is connected to the drive link 48, the wire 68 connects the head crank 46 to the drive link 48.

The drive link 48 is rotatable mounted to the disk drive 18 between its longitudinal ends. A finger is disposed on one axial end of the drive link 70. Connected to the finger is a head spring 78, which is fixed at its other end to the disk drive 18. Although in a preferred embodiment, the drive link 48 is attached to the head spring 78 with a finger, a variety of other attachment means may be employed. Since the head spring 78 is fixed to the disk drive 18, it biases the drive link 70 to rotate in the counter clockwise direction as viewed in FIG. 8.

The trolley 50 is mechanically connected through any of a variety of known fastening means including, but not limited to, an interference fit, a slide and groove and fasteners, to the drive link 48. In a preferred embodiment, the trolley 50 has a post running between its upper and lower surfaces and an opening at its axial end closest to the drive link 48. The longitudinal end of the drive link 48 closest to the trolley 50 also has a means for attaching to the trolley 50. In addition to being attached to the drive link 48, the trolley 50 is slidably connected to the groove 67 of the retainer 62.

The trolley 50 has freedom of movement in two degrees. In particular, the axial end of the trolley 50 connected to the drive link 48 is free to rotate about the center of the circular section of the other axial end. In addition, the circular shaped axial end is free to translate linearly in the groove 67 of the retainer 62. Thus, the trolley 50 can translate within the groove 67 and rotate about the center of one of its axial ends while translating.

As can be seen in FIG. 8, the drive link 48 and the trolley 50 are mounted so that they can move in an angular relationship with respect to each other. This occurs because the trolley 50 and the drive link 48 are rotatably mounted at one end and are fixed to each other at their respective opposing ends. Upon inspection of FIG. 8, it can be seen that if the carriage assembly traverses the entire length of the groove, the head crank 46 will only rotate about 180.

Through operation of the components described above, the disk drive heads 61 and the carriage assembly 56 can be held in a retracted position in the back of the disk drive 18. In an initial position the drive link 48 and the head crank 46 are spring biased by the head spring 78. Consequently, the drive link 48 and the trolley 50 are disposed at an angular relationship of about 180°. In this position, the heads 61 are in a retracted position because they are in the back of the disk drive 18. This is the position of the heads 61 when a disk cartridge 10 either is not inserted into the disk drive 18 or if an incorrect disk cartridge is inserted into the disk drive 18.

In order to move the heads 61 forward to interface with an inserted disk cartridge 10, the trolley 50 must be moved forward. Operation of the trolley 50 is controlled by the motor 44, which in turn is controlled by the microprocessor 35 and the electrical circuit 20b described above. Therefore, if the correct data storage cartridge 10 is inserted into the disk drive 18, its presence will be noted by the detector 22 and the electrical circuit 20b. The electrical circuit 20b will then send a signal to the microprocessor 35, which will cause the motor 44 to rotate. The powering of the motor 44 will then cause the trolley 50 to move to the forward part of the disk drive 18 and permit movement of the heads 61 to interface with the proper data storage cartridge 10.

In contrast, if an incorrect data storage cartridge 10 is detected, the microprocessor 35 will not power the motor 44. Consequently, the trolley 50 will not move and the movement of the heads 61 is prevented. Thus, the heads 61 cannot interface with the data storage cartridge 10 and danger to the disk drive 18 for operating with an improper data storage cartridge is prevented.

In further detail, the trolley 50 moves to allow the movement of the heads 61 as follows. The motor 44 is powered by the electrical circuit 20b and the microprocessor 35. When powered the motor 44 causes the head crank 46 to rotate. As the head crank 46 rotates counter clockwise as viewed in FIG. 8, the wire 68 acts as a cam and causes the drive link 48 to rotate in a clockwise direction against the pressure of the head spring 78. While being rotated, the head crank 46 is exerting a torque on the drive link 48 that is greater than the torque exerted by the head spring 78. Rotation of the drive link 48 causes the trolley 50 to translate forward and to rotate in the counter clockwise direction. As the drive link 48 and the trolley 50 rotate, they move into a more acute angular relationship with each other.

Each of these components will continue to move in the directions indicated above, until the drive link 48 is about perpendicular to the axis of the groove. In this position, the trolley 50 and the drive link 48 are in their most acute angular relationship, and the head spring 78 has been extended and is exerting a torque on the drive link 48 and the trolley 50 against the torque exerted by the head crank 46.

Figure 19:
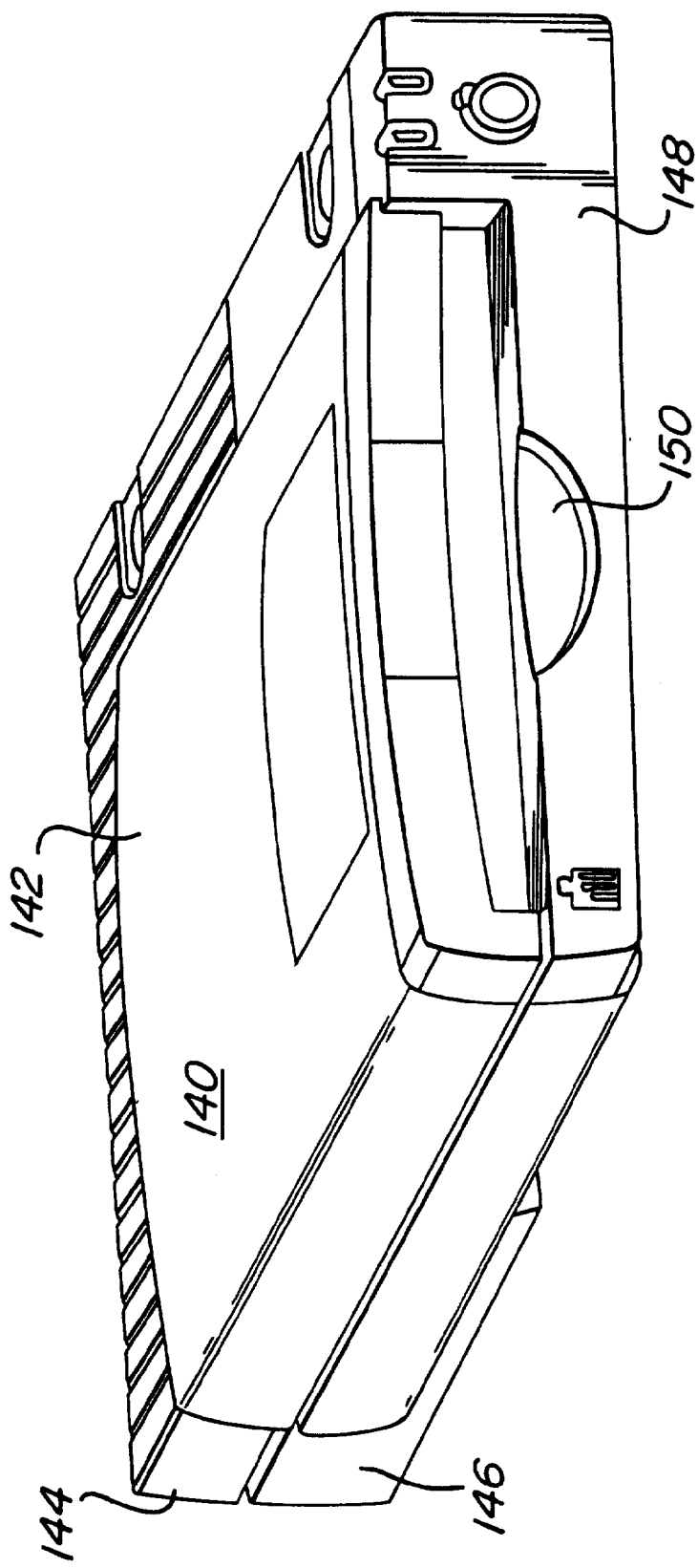
FIG. 19 is an isometric view of another preferred embodiment of a disk drive that can employ the detection device of this invention.

In another preferred embodiment of this invention, the electrical circuit 20b, the emitter 21, the detector 22 and the baffle 23 described above are disposed within the disk drive 140 illustrated in FIGS. 18 and 19. The operation of the heads in this disk drive is slightly different than the operation of the heads in the embodiment described above. However, in both embodiments the emitter 21, the detector 22, the baffle 23 and the electrical circuit 20b either permit or prevent the movement of the heads depending on whether a correct disk cartridge 10 has been inserted into the disk drive 18.

Figure 20:
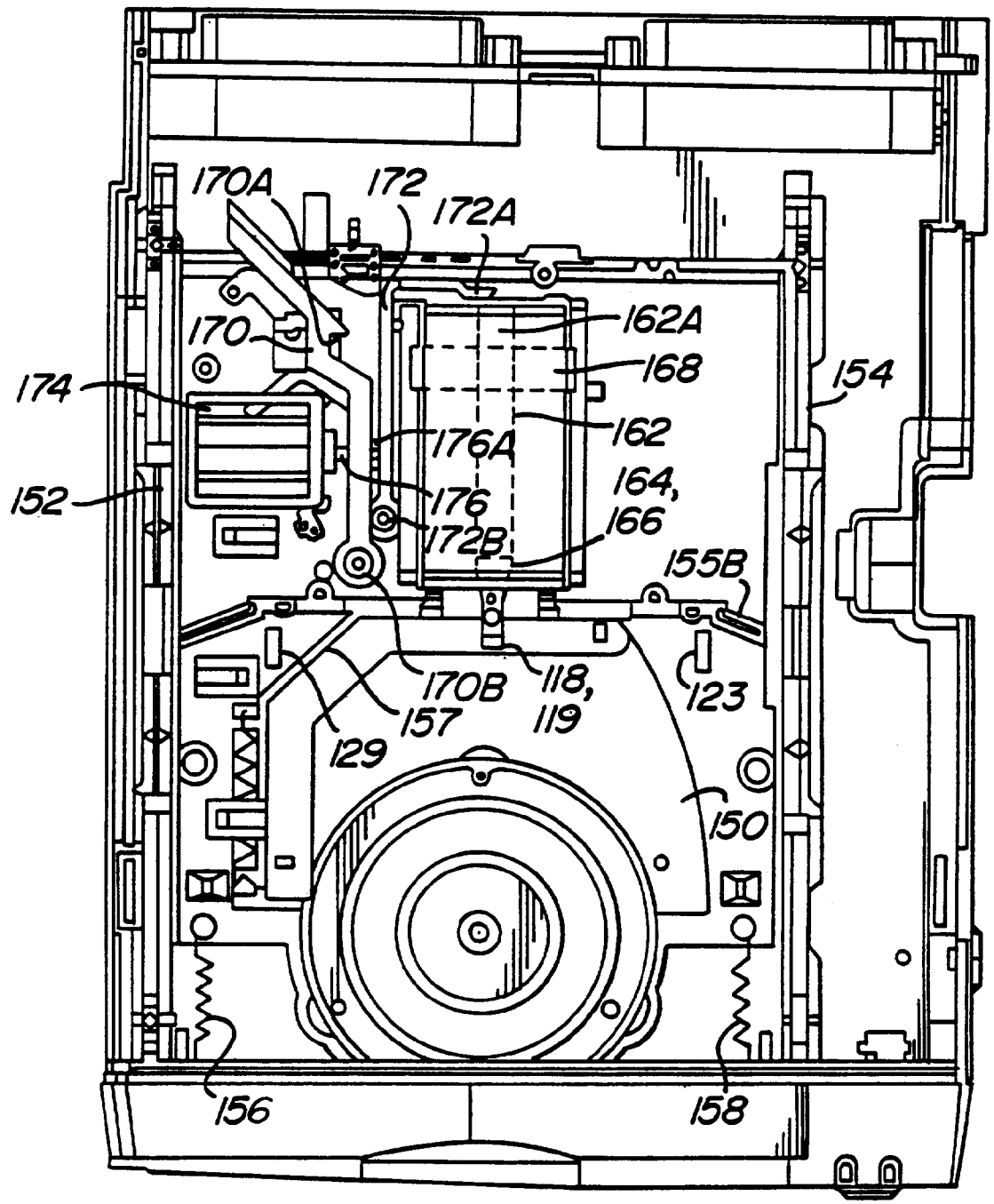
FIG. 20 is a top cut-away view of the disk drive of FIG. 19.

In this second embodiment, the disk drive 140 comprises an outer housing 142 having top and bottom covers 144, 146 and a front panel 148. A disk cartridge can be inserted into the disk drive 140 through a horizontal opening 150 in the front panel 148 of the disk drive 140. FIG. 20 is a top view of the disk drive 140 of the present invention with the top cover 144 removed. The disk drive 140 comprises an internal platform 150 that slides along opposing side rails 152, 154 between a forward position and a rearward position. A pair of springs 156, 158 bias the platform 150 in its forward position.

A linear actuator is mounted on the rear of the platform 150. The linear actuator comprises a carriage assembly 162 having two lightweight flexible arms 164, 166. The recording heads 118, 119 of the disk drive are mounted at the ends of the respective arms 164, 166. A coil 168, which is part of a voice coil motor, is mounted at the opposite end of the carriage 162. The coil 168 interacts with magnets (not shown) to move the carriage linearly so that the heads 118 and 119 can move radially over respective recording surfaces of a disk cartridge inserted into the disk drive.

A head locking lever 172 is also pivotally mounted on the platform 150 about a rotation shaft 172b. A second spring (not shown) is coupled to head locking lever 172 at its rotation shaft 172b also to bias the head locking lever 172 in the X+ direction. An end 172a of the head locking lever, which extends at a right angle to the main shaft of the lever 172, is adapted to releasably engage an end 162a of the actuator carriage 162 when the carriage 162 is in a fully retracted position, thereby locking the carriage in place and preventing inadvertent movement of the recording heads 118, 119.

A solenoid 174 has a drive shaft 176. When the solenoid 174 is energized by an electrical current, the drive shaft 176 moves in the X+ direction from a normally extended position toward a retracted position. As the drive shaft 176 of the solenoid 174 moves toward its retracted position, an enlarged operating end 176a of the drive shaft 176 engages the eject latch and head locking levers 170, 172 in order to pull the levers in the X+ direction against their normal spring bias. Movement of the head locking lever 172 in the X+ direction causes the end 172a of the head locking lever 172 to disengage from the end 162a of the carriage 162, thereby unlocking the actuator and allowing the actuator to move radially of the rotating disk. Similarly, movement of the eject latch lever 170 in the X+ direction causes the cutout 170a on the eject latch lever to disengage from the latch projection 178 thereby releasing the platform 150 and allowing the platform 150 to move back to its forward position.

The electrical circuit 20b is coupled to the solenoid 174. The emitter 21, detector 22, the baffle 23 and the electrical circuit 20b operate as described above in the first embodiment to determine if the correct disk cartridge 10, one with a retroreflective marker 11 has been inserted. If a data storage cartridge with a retroreflective marker is inserted, the electrical circuit 20b will cause the solenoid 174 to be powered. The solenoid 174 will then operate as described above to unlock the heads and permit them to be moved and interface with the data storage cartridge 10.

It is to be understood, however, that even in numerous characteristics and advantages of the present invention have been set forth in the foregoing description, together with details of the structure and function of the invention, the disclosure is illustrative only, and changes may be made to detail, especially in matters of shape, size and arrangement of parts within the principles of the invention to the full extent indicated by the broad general meaning of the terms in which the appended claims are expressed.

What is claimed is:

1. A disk drive that is capable of distinguishing between light reflected from a retroreflective marker on a disk cartridge and light reflected from a first surface of the disk drive, comprising:

a light source;

a detector for detecting reflected light; and a baffle disposed between the light source and the detector for filtering light reflected from the first surface so that a difference in an amount of light that the detector receives from the retroreflective marker and an amount of light received from the first surface is increased to permit the detector to note the presence of the retroreflective marker on the disk cartridge in the disk drive.

2. A disk drive that is capable of distinguishing between light reflected from a first source on a disk cartridge and light reflected from a first surface of the disk drive, comprising:

heads for interfacing with the disk cartridge;

a source of irradiance;

a detector of reflected irradiance;

a baffle disposed between the source and the detector, for filtering irradiance reflected from the first surface; and a means for enabling the heads to interface with the disk cartridge when an amount of reflected irradiance sensed by the detector exceeds a predetermined level.

3. A disk drive of claim 1, further comprising read/write heads for interfacing with the disk cartridge when the disk cartridge is inserted into the disk drive.

4. The disk drive of claim 3, further comprising an electrical circuit that controls the operation of the read/write heads.

5. The disk drive of claim 4, wherein the electrical circuit prevents movement of the read/write heads unless the detector senses an amount of light that is greater than a predetermined threshold.

6. The disk drive of claim 5, further comprising an actuator on which the read/write heads are disposed.

7. The disk drive of claim 1, wherein the baffle comprises a wall and a tongue that extends perpendicular from the wall.

8. The disk drive of claim 7, wherein the tongue extends perpendicular from the wall toward the light source.

9. The disk drive of claim 1, wherein the light source comprises a light emitting diode.

10. The disk drive of claim 2, with the first source comprises a retroreflective marker.

11. The disk drive of claim 2, wherein the means for enabling the heads comprises an electrical circuit that is responsive to the detector of reflected irradiance so that when the detector of reflected irradiance detects an amount of light that is greater than a predetermined threshold the means for enabling the heads provides electrical power to the heads so that they can interface with a disk cartridge.

12. The disk drive of claim 2, wherein the source of irradiance comprises a light emitting diode.

13. The disk drive of claim 2, wherein the heads are disposed on a linear actuator.

14. The disk drive of claim 2, wherein the baffle filters irradiance reflected from the first surface so that a difference in an amount of light received from the first source and an amount of light received from the first surface is increased to permit the detector of reflected irradiance to note the presence of the first source on the disk cartridge.

15. The disk drive of claim 2, wherein the baffle comprises a wall and a tongue that extends substantially perpendicular from the wall.

16. The disk drive of claim 15, wherein the tongue extends substantially perpendicular from the wall toward the source of irradiance.

17. A disk drive that is capable of distinguishing between light reflected from a first source on a disk cartridge and light reflected from a first surface of the disk drive, comprising:

read/write heads for interfacing with the disk cartridge;

a light source;

a detector for detecting reflected light;

a baffle, disposed between the source and the detector, for filtering light reflected from the first surface, so that a difference in an amount of light reflected from the first source to the detector and an amount of light reflected from the first surface to the detector is increased to permit the detector to note the presence of the first source on the disk cartridge in the disk drive;

a casing for encasing the source and the detector; and an electrical circuit that is responsive to the detector to activate the read/write heads of the disk drive to interface with the disk cartridge when the detector notes the presence of the first source on the disk cartridge within the disk drive.

18. The disk drive of claim 17, further comprising an actuator on which the read/write heads of the disk drive are disposed.

19. The disk drive of claim 18, further comprising a motor for powering the actuator and that is responsive to the electrical circuit.

20. The disk drive of claim 17, wherein the first source comprises a retroreflective marker.

* * * * *